UNITED STATES PATENT OFFICE.

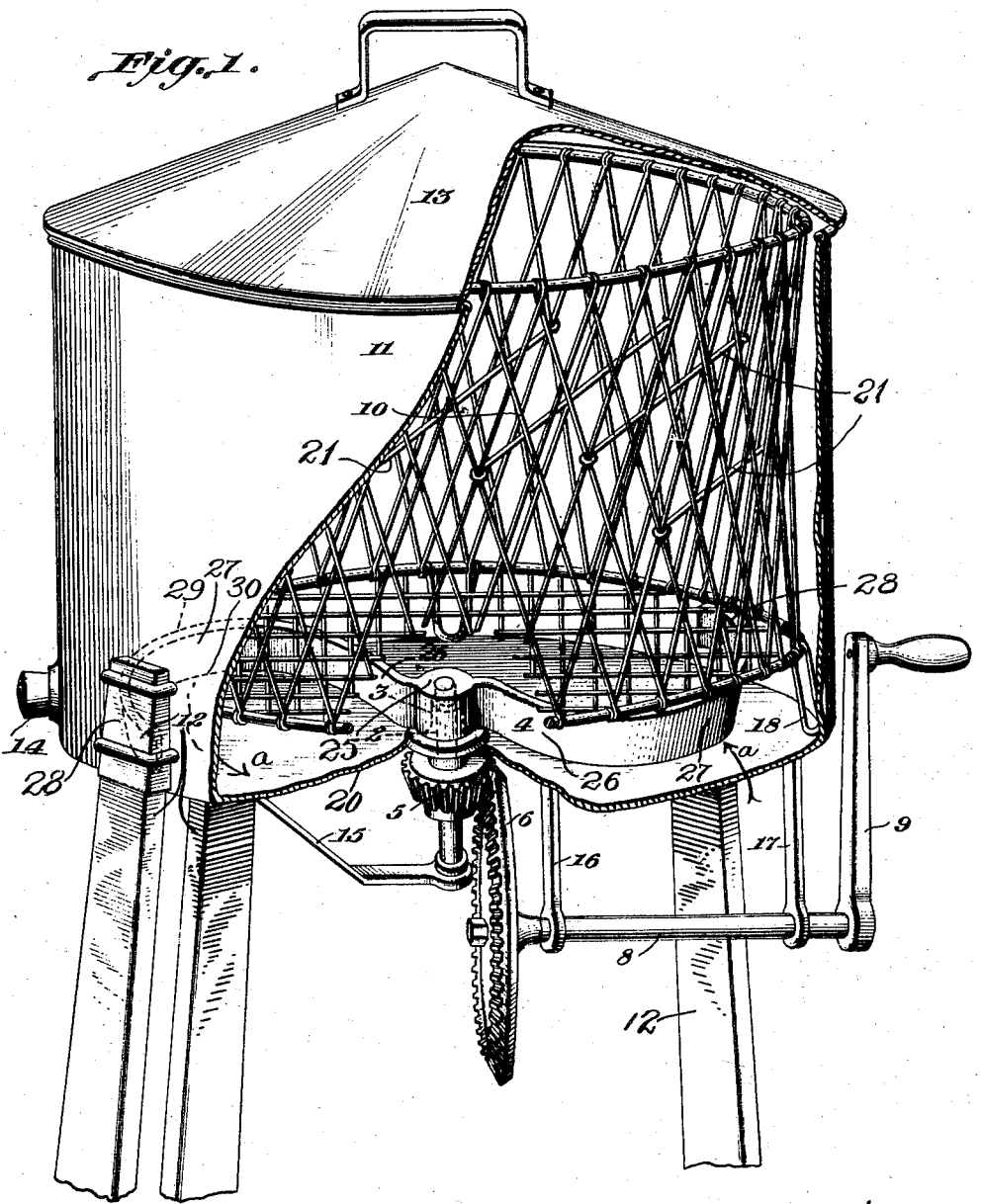

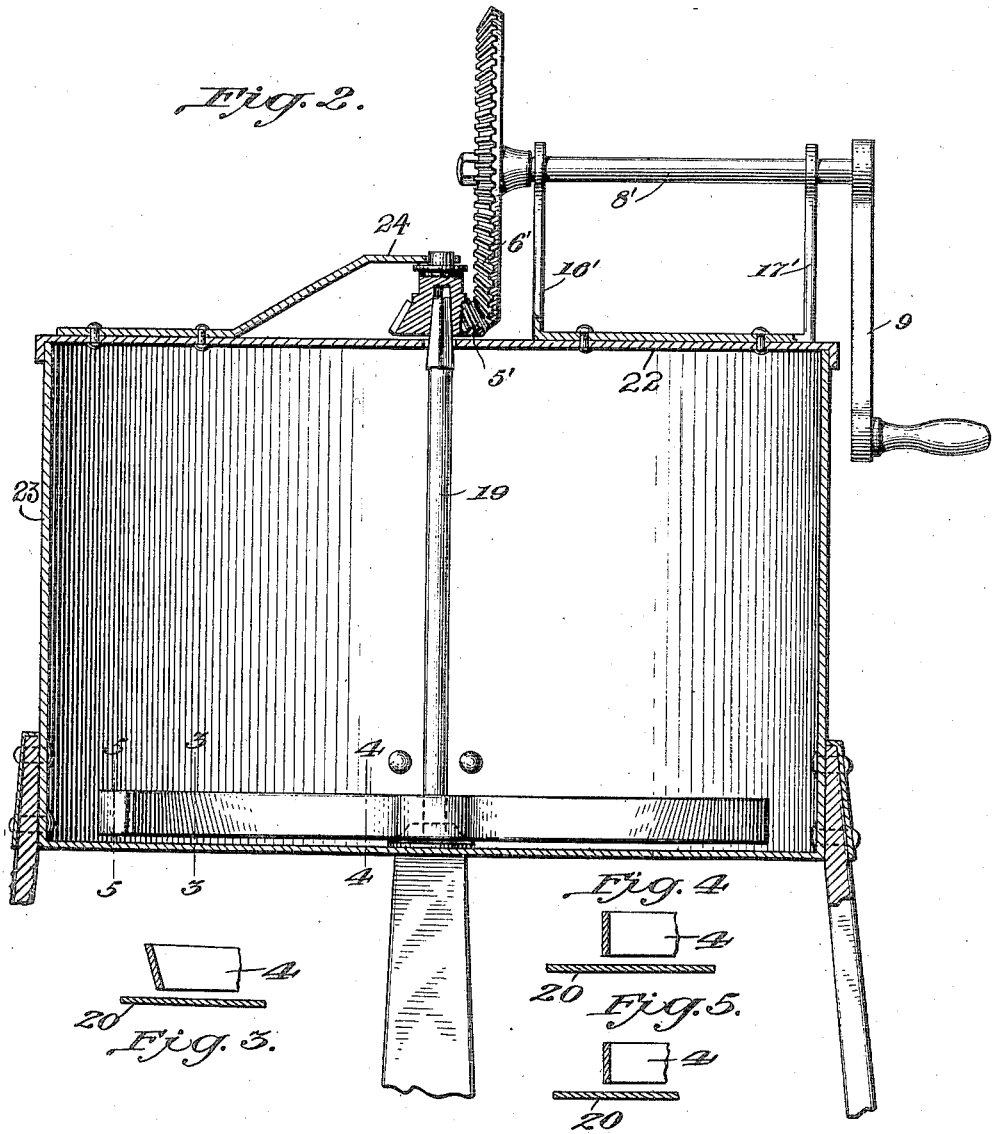

ORSON B. CLARK, OF SHERBURNE, NEW YORK.

DISH-WASHING MACHINE.

1,051,311. Specification of Letters Patent. Patented Jan. 21, 1913.

Application filed March 13, 1912. Serial No. 683,640.

*To all whom it may concern:*

Be it known that I, ORSON B. CLARK, a citizen of the United States, residing at Sherburne, in the county of Chenango, State of New York, have invented a new and useful Improvement in Dish-Washing Machines, of which the following is a specification.

My invention relates to that class of dish washing machines which include a receptacle in which the dishes are disposed, and means for positively projecting the water upwardly in said receptacle toward and about the dishes held therein.

In accordance with my invention, revoluble blades are provided for directing the water upwardly about the dishes and one of the objects of my invention is to provide an improved form of blade which will perform this function in an efficient and effective manner.

My invention will be more fully described in connection with the accompanying drawings and more particularly pointed out and ascertained in and by the appended claims.

In the drawings:—Figure 1 illustrates one form of my invention in a perspective view with part broken away and part in section. Fig. 2 illustrates a modified form of my invention in vertical section. Fig. 3 is a sectional view taken on the line 3—3 of Fig. 2. Fig. 4 is a sectional view taken on the line 4—4 of Fig. 2. Fig. 5 is a sectional view taken on the line 5—5 of Fig. 2.

Like characters of reference designate similar parts throughout the different figures of the drawing.

As illustrated, and referring more especially to Fig. 1, a receptacle is designated at 11 and is provided with a suitable removable top 13. The receptacle 11 is preferably cylindrical in form and may be provided with a flat bottom wall 20, and if desired, may be supported at an elevation from the floor by suitable supporting legs 12. An outlet 14 may be provided to empty the receptacle when it is desired to refill the same with clean water.

I provide means for suspending the dishes in the receptacle, above the bottom thereof, and said means may consist of a cylindrical rack 10, of reticulated formation, adapted to be supported on legs 18 engaging the bottom wall 20. The rack 10 may be provided with transversely disposed bars 21 between which the dishes may be disposed so as to be held in a substantially vertical position in the rack.

Blades 4 are revolubly mounted upon a ververtically disposed shaft 2, mounted near its upper end upon a suitable bearing 3 and being supported at its lower end by a suitable bearing 15. A gear 5 is secured to the shaft 2 and meshes with a gear 6 mounted upon a shaft 8. The shaft 8 is horizontally disposed and is mounted in pendent hanger bearings 16 and 17 and is provided with a crank 9 on its outer end, by means of which blade 4 may be operated.

In the form shown in Fig. 2, the blade operating shaft 19 extends upwardly from the bottom to the top 22 of the receptacle 23. The top 22 is in the form of a cover and may be removed and therefore the upper end of the shaft 19 is removably but non-revolubly connected with gear 5′ and the latter is mounted at its upper end in the bearing 24. Gear 5′ meshes with a gear 6′ mounted upon a shaft 8′. Shaft 8′ is mounted on bearings 16′ and 17′, secured to the cover 22. An operating crank 9 is secured to the shaft 8′.

Next referring to the blades 4, and more especially to Fig. 1, it will be seen that the same are formed integral with a hub 25, mounted on shaft 2, and project radially outwardly from the hub 25 toward the periphery of the receptacle 11. In the form shown two blades 4 are illustrated but I do not wish to be limited to the precise construction shown in this respect.

It will be seen by reference to Fig. 1 that the inner sections or portions 26 of the blade are curved rearwardly and outwardly with respect to the direction of rotation as indicated by the arrow *a*. Intermediate portions 27 are curved outwardly and the ends 28 are extended forwardly with respect to the direction of rotation. The inner sections 26 and the outer end sections 28 are substantially vertical and perpendicular to the bottom wall 20 whereas the intermediate portions 27 are inclined slightly rearwardly with respect to the direction of rotation, and with respect to the vertical. It will be seen by reference to Fig. 1 that the vertical portions 26 and 28 gradually merge into the inclined portions 27 so that both blades describe a continuous curve, the upper margins 29 being rearwardly disposed with respect to the lower margins 30, with respect to the direction of rotation.

It will be readily understood that in rotation, the blades tend to collect the water rearwardly with respect to rotation of the blades, and between the outer sections 28 and the inner sections 26 in a direction toward the intermediate curved sections 27. With the flow concentrated toward the intermediate sections 27, and with the latter inclined rearwardly, it will be readily seen that the action of the blades tends to direct the water upwardly into the rack 11 and about the dishes contained therein. By reason of this construction the blades do not merely act as water agitators or splashers but positively direct the water upwardly into the rack 10. By disposing the inclined intermediate portions 27 between the center and the periphery of the receptacle 11, I obtain a continuous upward flow into the dish rack in a circular zone between the center and the periphery of the rack. The resulting downward flow will necessarily be through the central zone and the peripheral zone, at opposite sides of the upward flow caused by the intermediate portions 27.

It is desirable to fill the receptacle to a point slightly above the blades 4, in order to get the best results.

While I have herein shown and described specific forms of my invention, I do not wish to be limited thereto except for such limitations as the claims may import.

I claim:—

1. A dish washing machine comprising in combination, a receptacle having a circular flat bottom wall, a dish rack disposed in said receptacle above the bottom wall thereof, and a plurality of blades revolubly mounted in said receptacle between the bottom wall and said rack, said blades extending from the center of said wall outwardly to a point adjacent the periphery thereof, the central and outward portions of said blades being perpendicular to said bottom wall and intermediate portions of the blades being inclined rearwardly to the vertical with respect to the direction of rotation of said blades, and disposed rearwardly of the outer ends of the blades with respect to the direction of rotation thereof, substantially as described.

2. A dish washing machine comprising in combination, a receptacle having a circular flat bottom wall, a dish rack disposed in said receptacle above the bottom wall thereof, and a plurality of blades revolubly mounted in said receptacle between the bottom wall and said rack, said blades being continuously curved and extending rearwardly from the center of said wall with respect to the direction of rotation and then outwardly and forwardly with respect to the direction of rotation and toward the periphery of said wall, the central and outer portions of the blades being perpendicular to said bottom wall and the intermediate portions of the blades being inclined with respect to the vertical rearwardly with regard to the direction of rotation of said blades, substantially as described.

3. A dish washing machine comprising in combination, a receptacle adapted to contain a quantity of water, means for supporting the dishes in said receptacle, and a revoluble blade disposed in the water and having a free collecting portion extending forwardly with respect to the direction of rotation of the blade, and a portion inclined rearwardly with respect to the direction of rotation of the blade, the inclined portion being rearwardly disposed with respect to the collection portion, as regards the direction of rotation of the blade, substantially as described.

Dated Feb. 5, 1912.

ORSON B. CLARK.

Witnesses:
RALPH CLARK,
C. A. FULLER.